(12) United States Patent
Voli

(10) Patent No.: US 10,643,045 B1
(45) Date of Patent: May 5, 2020

(54) STAGED BATTERY LATCHING MECHANISM

(71) Applicant: Zebra Technologies Corporation, Lincolnshire, IL (US)

(72) Inventor: Edward M. Voli, East Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/271,349

(22) Filed: Feb. 8, 2019

(51) Int. Cl.
*G06K 7/10* (2006.01)

(52) U.S. Cl.
CPC ....... *G06K 7/1098* (2013.01); *G06K 7/10881* (2013.01)

(58) Field of Classification Search
CPC .............................. H02J 7/0044; G06F 1/1635
USPC ..... 235/472.01; 361/679.58, 679.56, 679.55, 361/747, 679.57; 320/112, 107, 114; 340/5.7
See application file for complete search history.

(56) References Cited

U.S. PATENT DOCUMENTS

D488,436 S 4/2004 Wulff
7,299,373 B2 11/2007 Wulff

*Primary Examiner* — Jamara A Franklin

(57) ABSTRACT

A mobile device housing defines a battery compartment with a wall extending from an open rear to a closed front. A first latch stop extends from the wall between the rear and the front. A second latch stop extends from the wall between the first stop and the rear. A battery receivable in the compartment includes a latch that: extends to engage the first stop and maintain the battery fully inserted, and to engage the second stop and prevent ejection of the battery from an intermediate position; and retracts to disengage from the first stop, unlocking the battery for travel to the intermediate position, and to disengage from the second stop for ejection of the battery from the intermediate position.

23 Claims, 9 Drawing Sheets

STAGED BATTERY LATCHING MECHANISM

BACKGROUND

Various devices, such as mobile computing devices, are powered by removable batteries (e.g. removable for recharging and replacement). The batteries are typically held in place until removal is desired, at which time a release mechanism is activated. However, activation of the release mechanism may lead to the battery falling from the device, which may lead to damage to the battery. Additional release mechanisms may be implemented to mitigate the above risk, but such mechanisms increase cost and manufacturing complexity.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
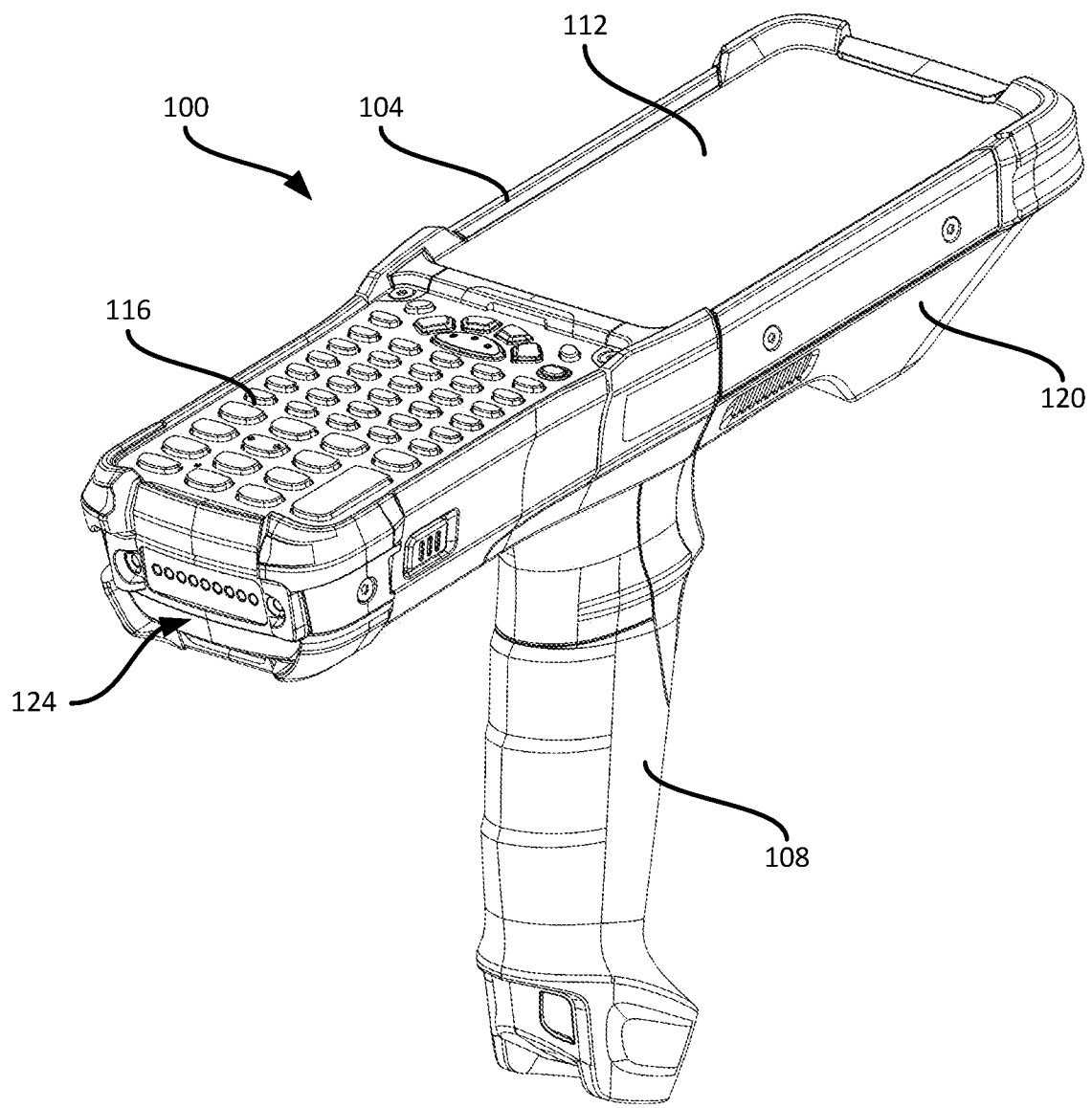
FIG. 1 is an isometric view of a mobile computing device with a battery in an inserted position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device, comprising: a device housing defining a battery compartment having (i) an open rear end, (ii) a closed front end, and (iii) a side wall extending between the open rear end and the closed front end; a first latch stop extending into the compartment from the side wall between the open rear end and the closed front end; a second latch stop extending into the compartment from the side wall between the first latch stop and the open rear end; and a battery receivable in the battery compartment, the battery including a latch movable between: an extended position wherein the latch is configured to (i) engage the first latch stop when the battery is in an inserted position, to maintain the battery in the inserted position, and (ii) engage the second latch stop when the battery is in an intermediate position, to prevent ejection of the battery from the intermediate position; and a retracted position wherein the latch is configured to (i) disengage from the first latch stop to unlock the battery for travel from the inserted position to the intermediate position, and (ii) disengage from the second latch stop for ejection of the battery from the intermediate position.

Additional examples disclosed herein are directed to a battery for a mobile computing device, comprising: a battery housing receivable within a battery compartment of the mobile computing device; a latch movably supported by the battery housing between: an extended position wherein the latch is configured to (i) engage a first latch stop of the battery compartment when the battery is in an inserted position, to maintain the battery in the inserted position, and (ii) engage a second latch stop of the battery compartment when the battery is in an intermediate position, to prevent ejection of the battery from the intermediate position; and a retracted position wherein the latch is configured to (i) disengage from the first latch stop to unlock the battery for travel from the inserted position to the intermediate position, and (ii) disengage from the second latch stop for ejection of the battery from the intermediate position.

Further examples disclosed herein are directed to a mobile computing device, comprising: a device housing defining a battery compartment for receiving a battery, the battery compartment having: an open rear end; a closed front end; and a side wall extending between the open rear end and the closed front end; a first latch stop extending into the compartment from the side wall between the open rear end and the closed front end, wherein the first latch stop is configured to engage with a latch on the battery to maintain the battery in an inserted position within the battery compartment; and a second latch stop extending into the compartment from the side wall between the first latch stop and the open rear end, wherein the second latch stop is configured to engage with the latch to prevent ejection of the battery from an intermediate position.

FIG. 1 depicts a mobile computing device 100, which may be deployed in a wide variety of environments, including transport and logistics facilities (e.g. warehouses), healthcare facilities, and the like. The mobile device 100 in the example illustrated in FIG. 1. includes a housing having a body portion 104 and a grip portion 108. In the present example the grip 108 is a pistol grip, although in other examples the grip 108 can have various other configurations, or can simply be omitted. The body 104 of the housing supports various components of the mobile device 100, including a display 112 (which may have an integrated touch screen), a keypad assembly 116, and a data capture assembly 120 such as a barcode reader. The body 104 of the housing can also support various other internal components, including microcontrollers, communication assemblies, and the like.

The above-mentioned components of the device 100 are powered by a battery 124, such as a rechargeable battery (e.g. lithium-ion, or any other suitable battery chemistry). The battery 124 is removably supported in a battery compartment defined by the body 104. In FIG. 1, the battery 124 is shown in an inserted position, in which the battery 124 is fully received within the battery compartment and supplies power to the components of the mobile device 100. As will be discussed below in greater detail, the device 100 includes a staged battery latching mechanism enabling removal of the battery 124 from the inserted position shown in FIG. 1 in two distinct stages. In a first stage, shown in FIG. 2, the battery 124 is partially ejected from the battery compartment via activation of a primary actuator 200 supported by the body 104 (as well as a matching actuator on an opposite side of the mobile device 100 and therefore not visible in FIG. 2). The battery 124 is, however, prevented from fully ejecting from the mobile device 100 until another actuator 204, supported by the battery 124 itself, is activated.

Figure 2:
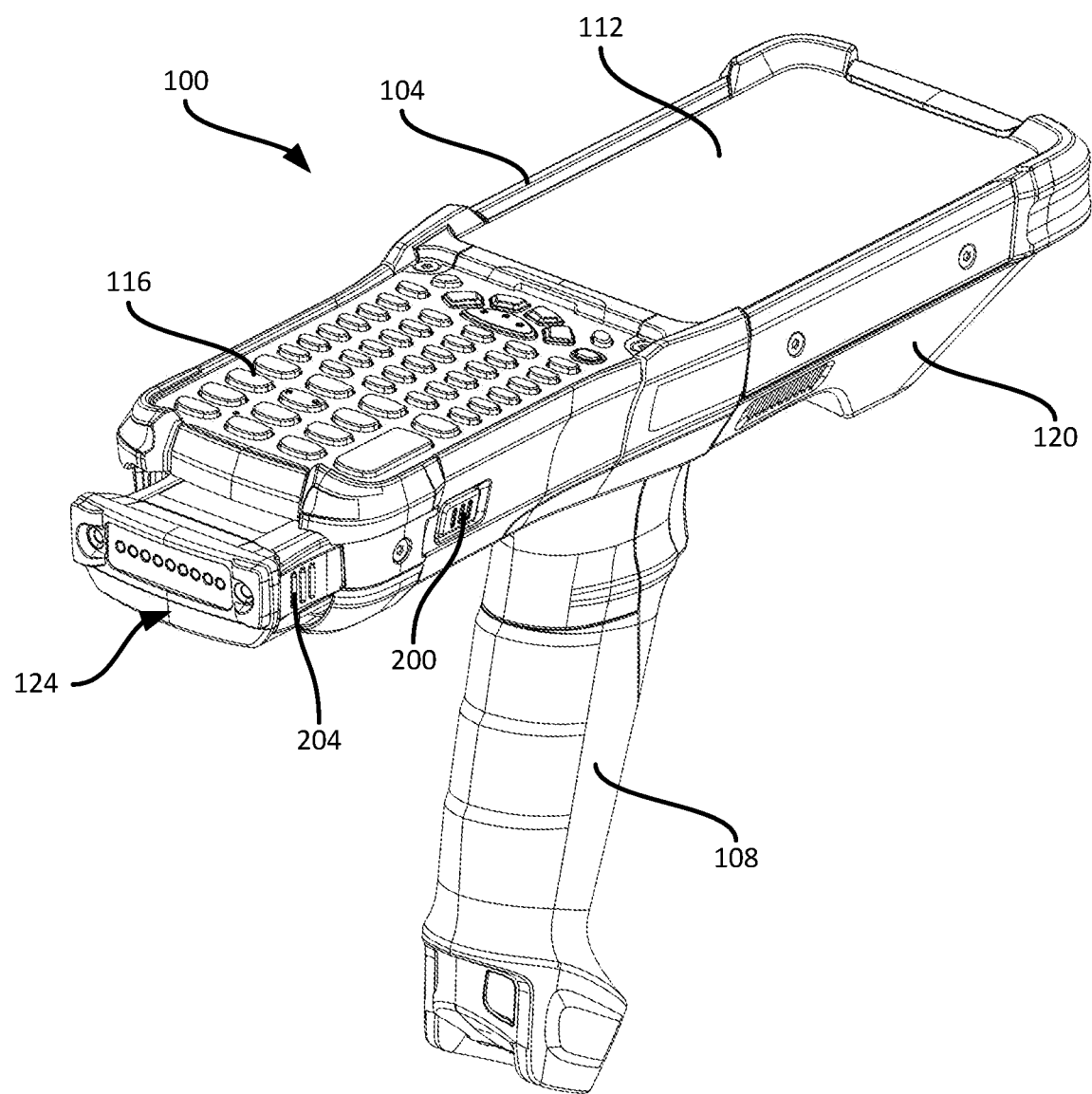
FIG. 2 is an isometric view of the mobile computing device of FIG. 1 with the battery in an intermediate position.
Figure 3:
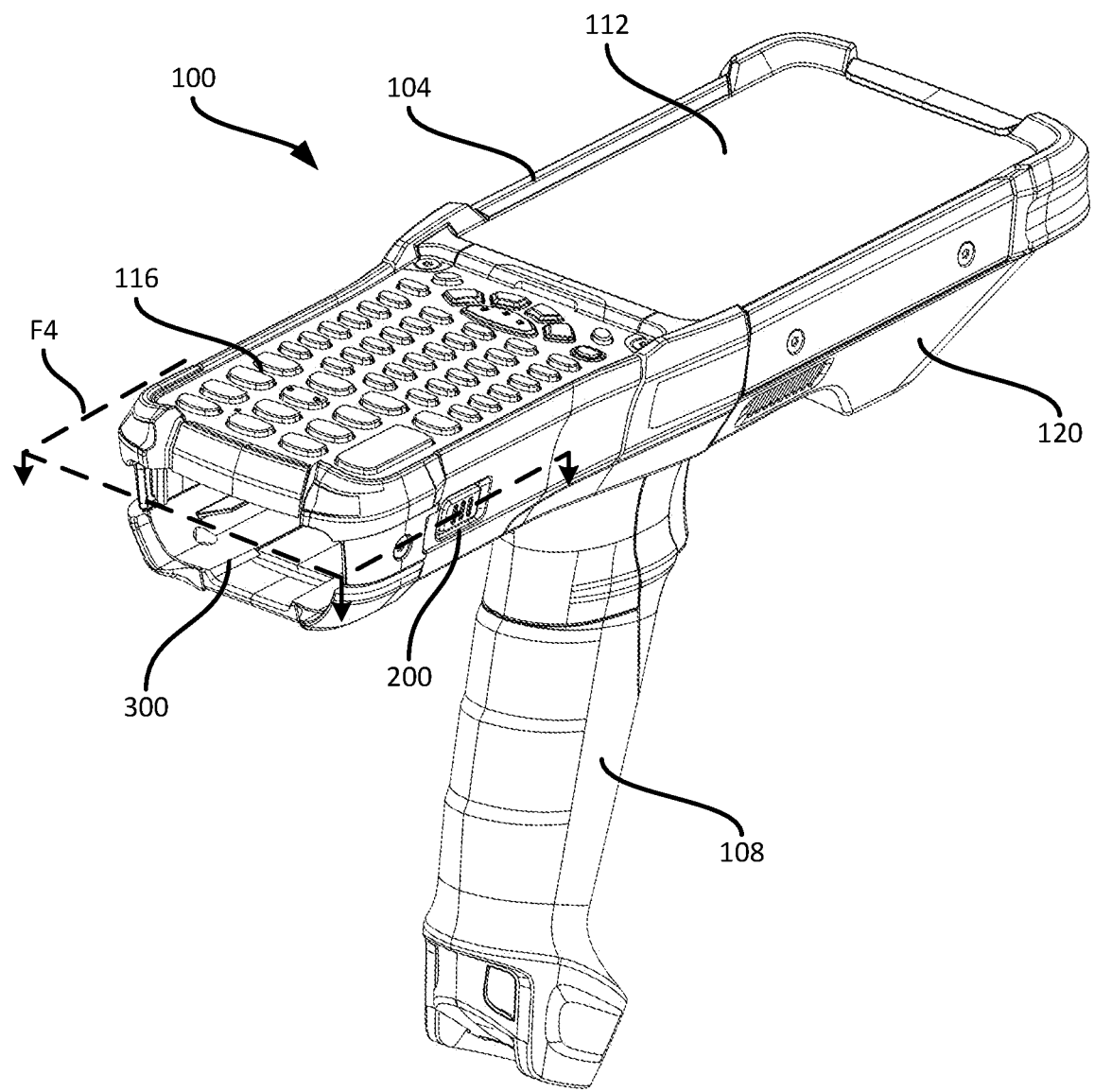
FIG. 3 is an isometric view of the mobile computing device of FIG. 1 with the battery ejected.

Following activation of the actuator 204 (as well as a matching actuator on an opposite side of the battery 124 and therefore not visible in FIG. 2), the battery 124 is permitted to fully eject from the mobile device 100. FIG. 3 illustrates the mobile device 100 following complete ejection of the battery 124. A battery compartment 300 is partially visible in FIG. 3 following removal of the battery 124.

Figure 4:
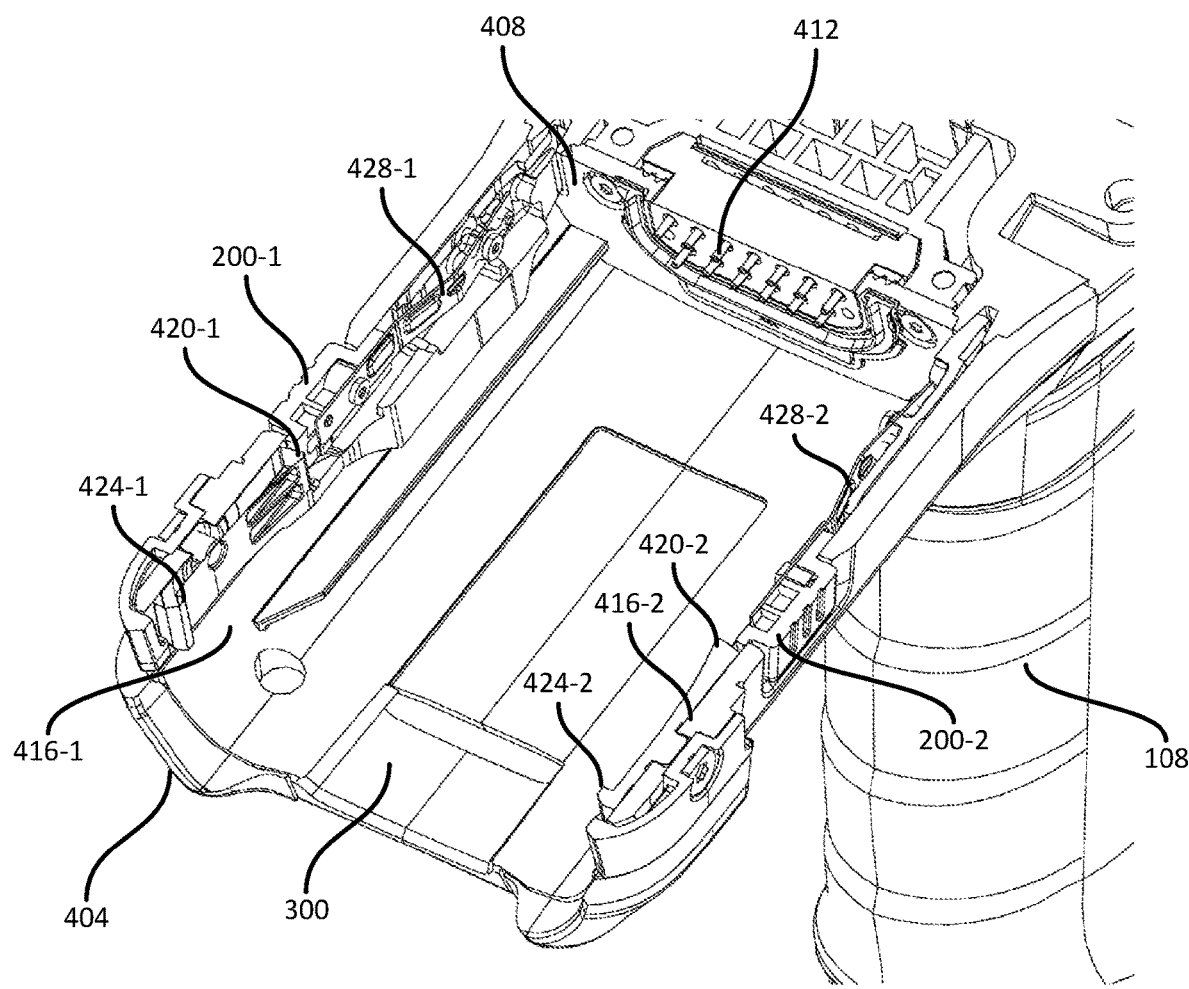
FIG. 4 is an isometric partial cross-sectional view of the mobile computing device of FIG. 3.

Turning to FIG. 4, the above-mentioned staged latching mechanism will be discussed in greater detail. FIG. 4 illustrates a cross-sectional view of the mobile device 100 as shown in FIG. 3 (i.e. without the battery 124), at the section plane F4. As seen in FIG. 4, the battery compartment 300 includes an open rear end 404, and an opposing closed front end. In particular, the front end of the compartment 300 is defined by a wall 408 bearing a set of contacts 412. In the present example, the contacts 412, which electrically connect the battery 124 to the internal components of the mobile device 100 when the battery 124 is fully inserted into the compartment 300, are pogo pins. The contacts 412 therefore bias the battery 124 towards the ejected position (i.e. away from the wall 408).

The battery compartment 300 also includes a set of walls extending between the front wall 408 and the open rear end 404 to form the compartment 300. In particular, the walls include opposing side walls 416-1 and 416-2 defining the sides of the compartment 300 between the open rear 404 and the front wall 408. At least one of the side walls includes a pair of latch stops. In the illustrated example, each side wall 416 includes first and second latch stops. Thus, the side wall 416-1 includes a first latch stop 420-1 and a second latch stop 424-1, while the side wall 416-2 includes a first latch stop 420-2 and a second latch stop 424-2. The latch stops 420 and 424 extend into the compartment 300 from the side walls 416. Each pair of latch stops (that is, the pair consisting of latch stops 420-1 and 424-1, and the pair consisting of latch stops 420-2 and 424-2) is configured to engage a corresponding latch structure on the battery 124 itself, as will be discussed in greater detail below.

The above-mentioned actuators 200 are also shown in FIG. 4. In particular, the mobile device 100 includes two actuators 200-1 and 200-2 disposed on opposing sides of the device housing (specifically the body 104). The actuators are movable between a resting position, shown in FIG. 4, and an activated position, in which the actuators 200 extend into the compartment 300 adjacent to the first latch stops 420-1 and 420-2. In the present example, the actuators 200 are buttons exposed to the exterior of the mobile device 100 to permit the actuators 200 to be pressed by an operator to move the actuators from the resting position to the activated position.

The actuators extend through respective apertures in the body 104 of the device housing, and are mounted on respective flexible plates 428-1 and 428-2. The flexible plates 428-1 and 428-2 are affixed to the side walls 416-1 and 416-2, respectively at rear ends thereof, and carry the actuators 200-1 and 200-2, respectively, at forward ends thereof. Pressure exerted on an actuator 200 therefore deforms the plate 428 carrying the actuator 200, and moves the actuator 200 into the compartment 300. Release of the above-mentioned pressure permits the actuator 200 to return to the resting position (e.g. the plates 428 may be biased towards the resting position). In other examples, the actuators 200 may be movably supported by the body 104 by other suitable mechanisms, such as coil springs, flexible gaskets or the like.

Figure 5:
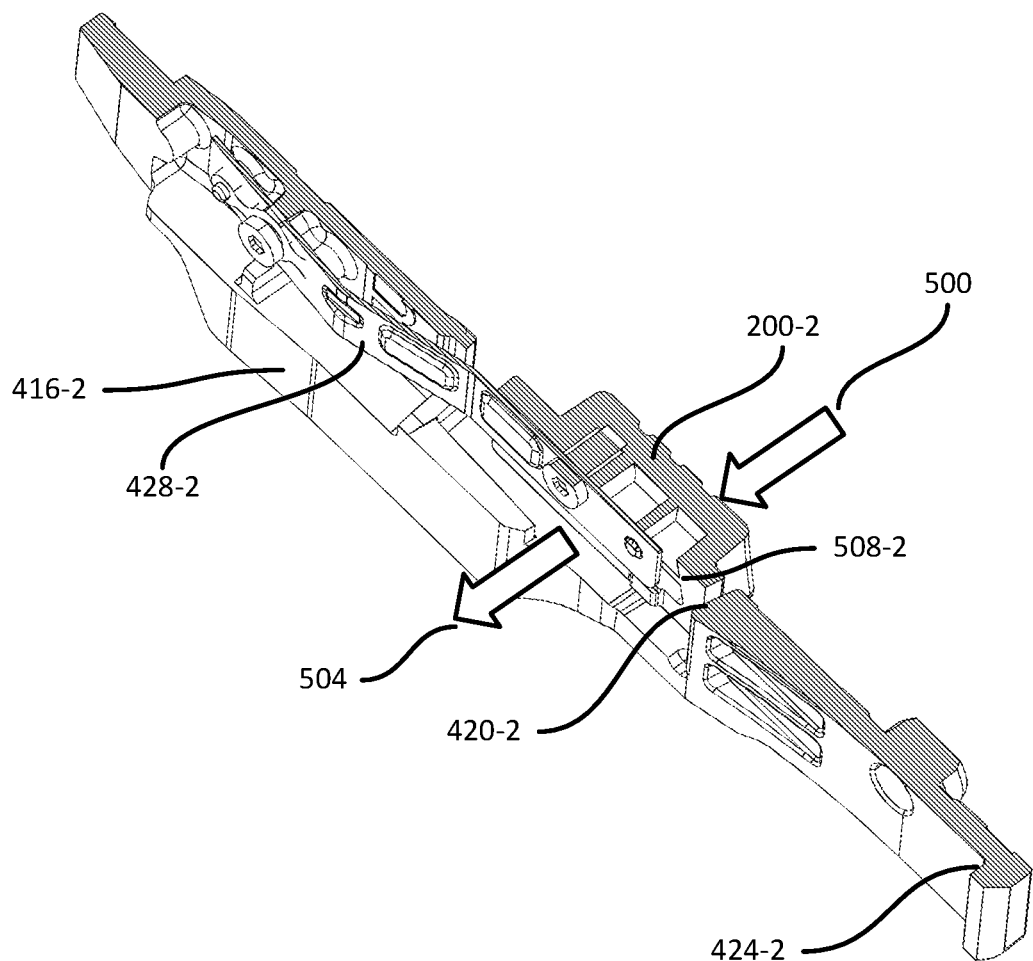
FIG. 5 is a cross-sectional view of latch stop and actuator components of the mobile computing device shown in FIG. 4.

Turning to FIG. 5, a detailed cross-sectional view of the latch stops 420-2 and 424-2 and the actuator 200-2 is shown. As noted above, an external force 500 on the actuator 200-2, e.g. applied to the actuators 200-1 and 200-2 by grasping and squeezing the actuators 200 together, deforms the plate 428-2 and moves the actuator 200-2 into the compartment 300 in the direction 504 illustrated in FIG. 5. A strike surface 508-2 of the actuator 200-2 located adjacent to the first latch stop 420-2 therefore travels towards the interior of the compartment 300. In traveling into the compartment 300, the strike surface 508-2 contacts a latch mechanism of the battery 124 and disengages the latch mechanism from the first latch stop 420-2, as will be discussed below.

Figure 6:
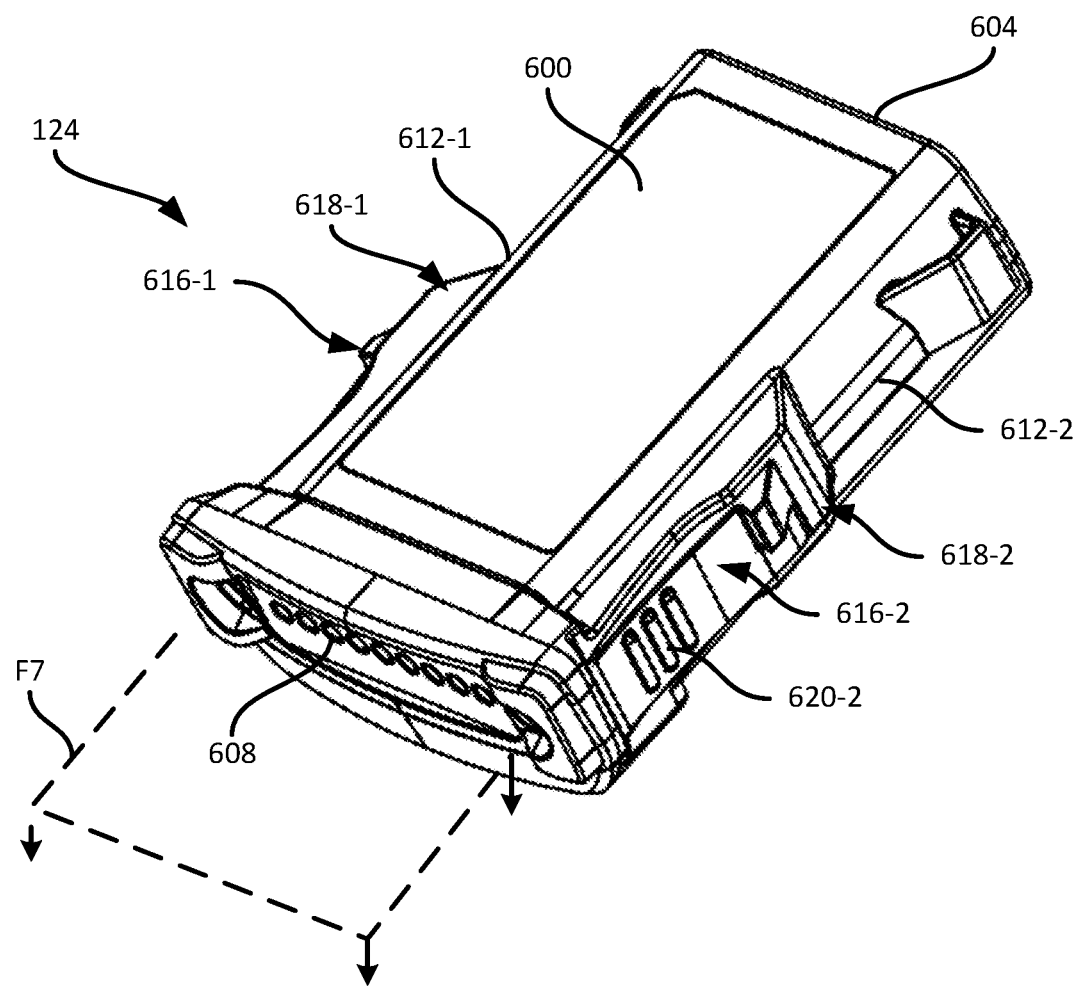
FIG. 6 is an isometric view of the battery of the mobile computing device of FIG. 1 in isolation.

Turning to FIG. 6, the battery 124 is shown in isolation. The battery 124 includes a battery housing 600 having a rear end 604 for insertion into the compartment and engagement with the electrical contacts 412. The battery housing 600 also includes a rear end 608, which in the present example bears additional electrical contacts, for example for engaging corresponding contacts in a charger (not shown). The battery housing 600 further includes side walls 612-1 and 612-2. Each side wall 612 supports a respective movable latch 616-1, 616-2. The latches 616 are movable between an extended position, as shown in FIG. 6, and a retracted position. The battery housing 600 includes, in the illustrated example, housing extensions 618-1 and 618-2. As will be shown below in FIGS. 7A-7B, the latches 616-1 and 616-2 travel into the housing extensions 618-1 and 618-2, respectively when transitioning to the retracted position. In other embodiments, the housing extensions 618 can be omitted.

As will be apparent in the discussion below, the latches 616 are configured to engage the first and second latch stops 420 and 424 in the extended position, and to disengage from the first and second latch stops 420 and 424 in the retracted position. That is, in the extended position the latches 616 are configured to prevent withdrawal of the battery 124 from the compartment beyond either the inserted position or the intermediate position. Further, in the retracted position, the latches 616 are configured to unlock the battery 124, permitting movement of the battery 124 from the inserted position to the intermediate position (shown in FIG. 2), as well as to permit complete ejection of the battery 124 from the intermediate position (as shown in FIG. 3).

As also shown in FIG. 6, each latch 616 includes a secondary actuator in the form of an actuator surface 620 (only the actuator surface 620-2 is visible in FIG. 6). The actuator surfaces 620 are exterior surfaces of the latches 616, and are configured to receive pressure (e.g. from the operator of the mobile device 100) when the battery 124 is in the intermediate position. Responsive to such pressure, the latches 616 move to the retracted position. The actuator surfaces 620 can be ridged, as shown, or otherwise textured or visually distinguishable from the remainder of the latches 616.

Figure 7A:
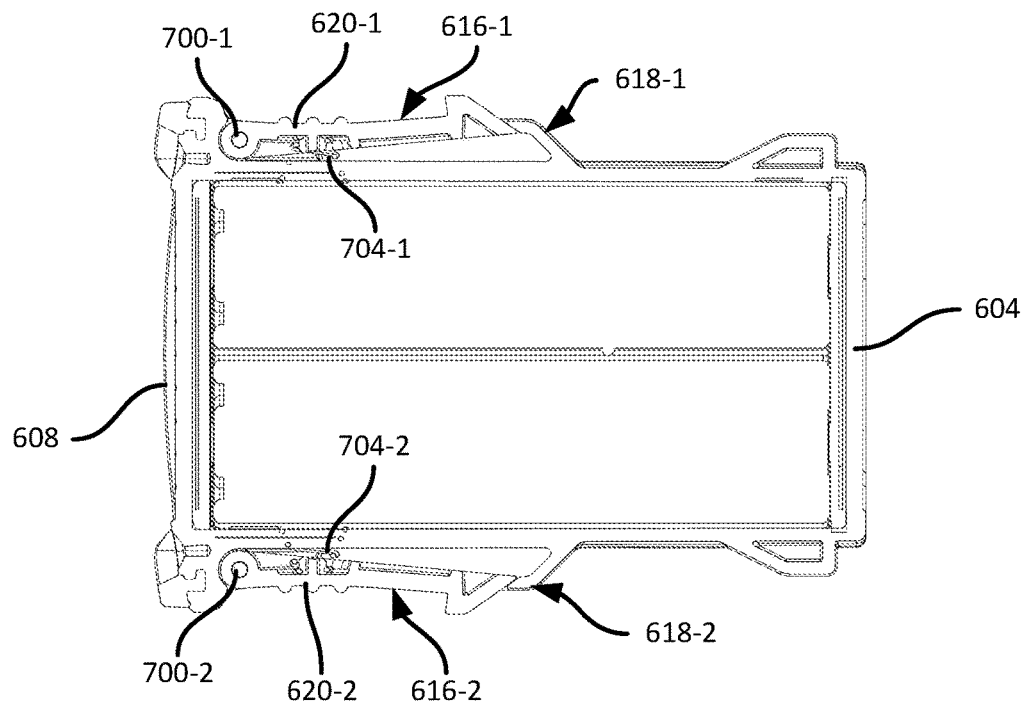
FIG. 7A is a cross-sectional view of the battery of FIG. 6 with latches thereof in an extended position.
Figure 7B:
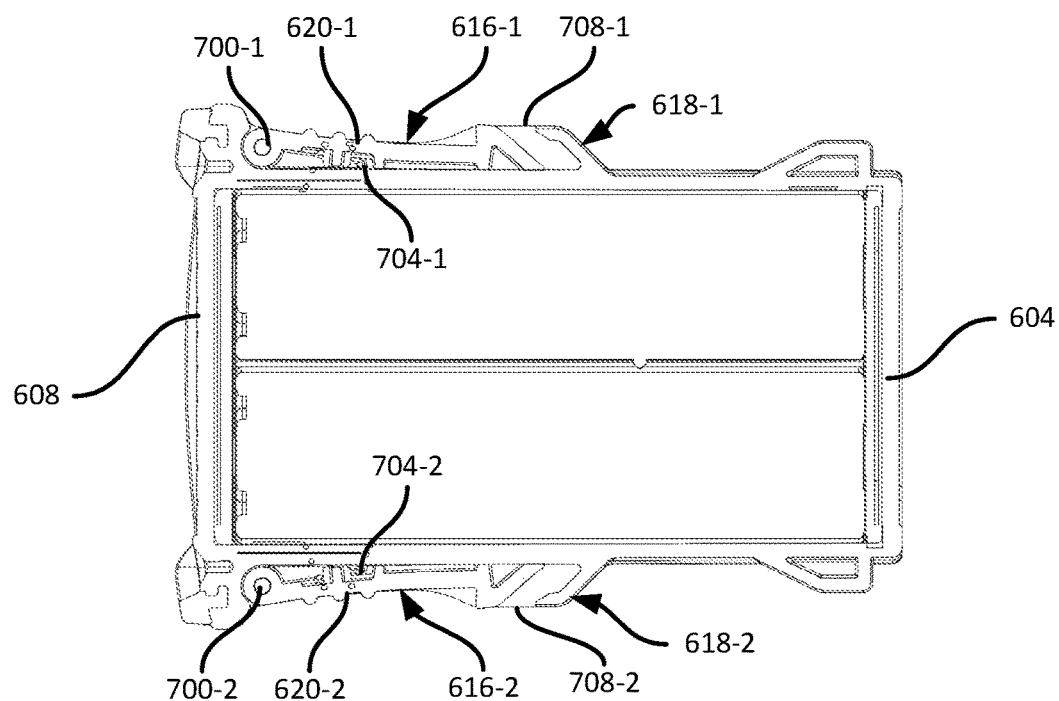
FIG. 7B is a cross-sectional view of the battery of FIG. 6 with latches thereof in a retracted position.

FIGS. 7A and 7B illustrate sectional views of the battery 124 at the section plane F7 (as shown in FIG. 6). Specifically, FIG. 7A illustrates the battery 124 with the latches 616 in the extended position, while FIG. 7B illustrates the latches in the retracted position. As seen in FIGS. 7A and 7B, the latches 616 are rotatable relative to the battery housing 600 about joints 700-1, 700-2, such as pins supported by the housing 600 about which the latches 616 can rotate. Further, the latches 616 are biased towards the extended position shown in FIG. 7A by biasing members, such as coil springs 704-1, 704-2 between the housing 600 and each latch 616. As seen in FIG. 7B, when the latches 616 are retracted, lower edges 708-1 and 708-2 of the housing extensions 618-1 and 618-2 are visible, having been concealed by the latches 616 in FIG. 7A.

Figure 8:
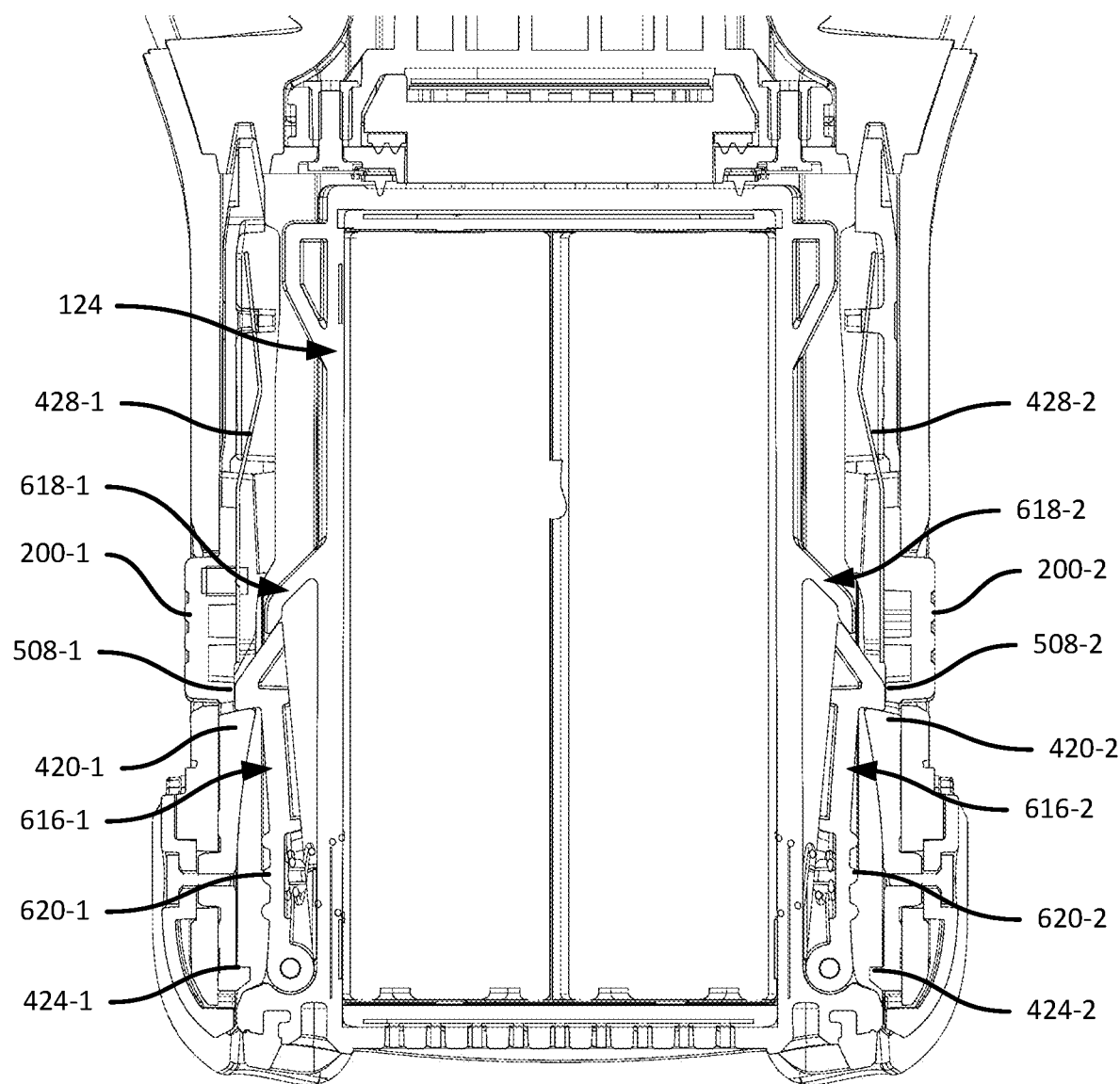
FIG. 8 is a top partial cross-section view of the mobile computing device of FIG. 1.

Turning to FIG. 8, a cross sectional view of the compartment 300 with the battery 124 fully inserted therein is illustrated. As shown in FIG. 8, the latches 616 are in the extended position and therefore engage the first latch stops 420, maintaining the battery 124 in the inserted position. That is, the latches 616 act to prevent the battery 124 from moving from the inserted position shown to the intermediate position. As also seen in FIG. 8, the secondary actuators (i.e. the actuator surfaces 620) are not exposed to the exterior of the mobile device 100. Instead, the actuator surfaces 620 are within the compartment 300, and are therefore inaccessible to the operator of the mobile device 100.

To remove the battery 124 from the inserted position shown in FIG. 8, two distinct stages are provided. In a first stage, the battery 124 is moved from the inserted position to the intermediate position by applying pressure to the primary actuators 200 from outside the mobile device 100. Application of pressure to the primary actuators 200 moves the primary actuators into the compartment 300, engaging the strike surfaces 508 with the latches 616 and displacing the latches 616 from the first latch stops 420. Disengagement of the latches 616 from the first latch stops 420 permits movement (e.g. driven by the biasing effect of the pogo pins 412 or other biasing members) of the battery 124 from the inserted position to the intermediate position. As will now be apparent, movement of the battery 124 directly to full ejection is prevented by the second latch stops 424. In particular, when the latches 616 are disengaged from the first latch stops, the battery 124 moves rearward and the latches 616 return to the extended position, as they are no longer forced inwards by the primary actuators 200.

Figure 9:
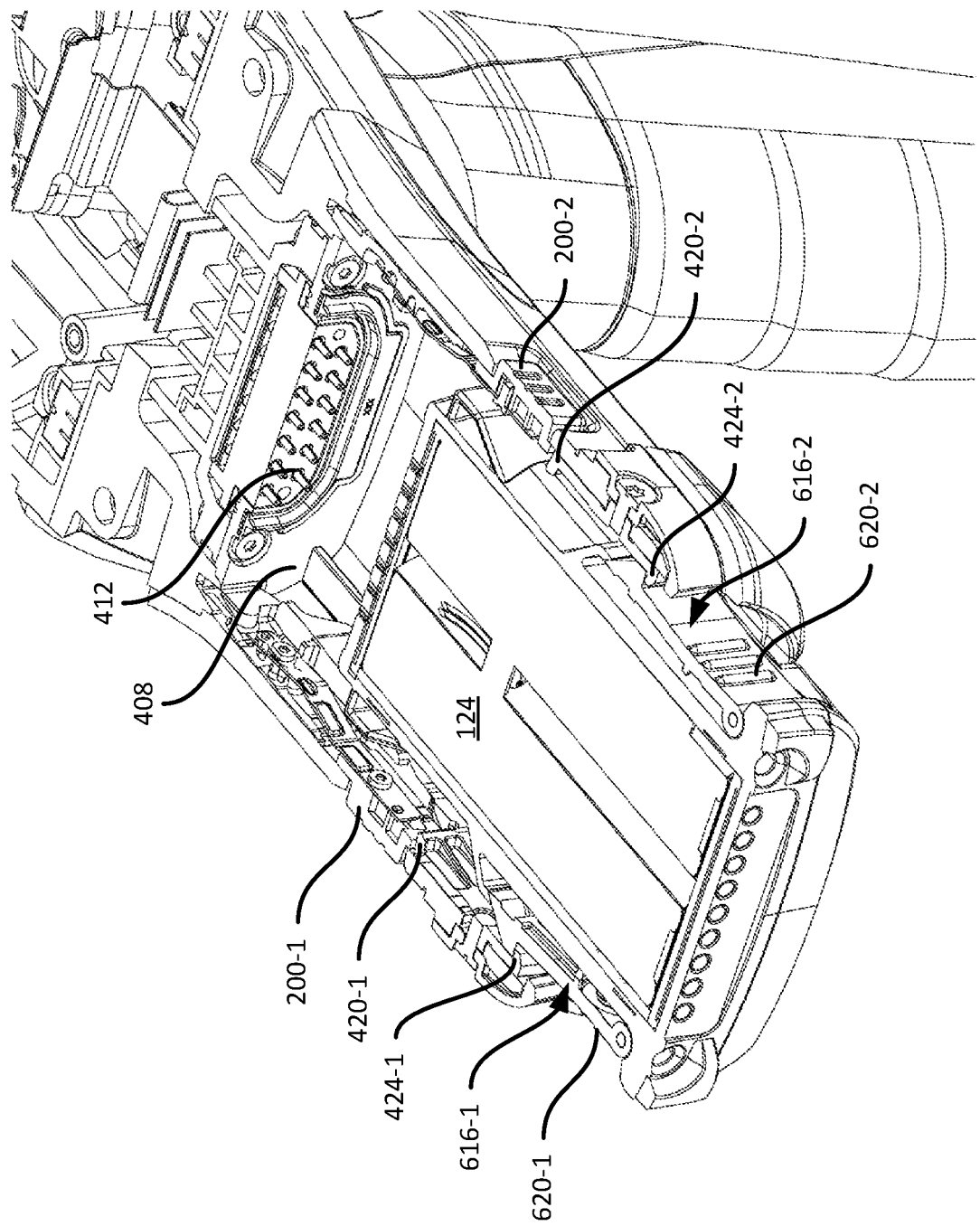
FIG. 9 is an isometric partial cross-sectional view of the mobile computing device of FIG. 2.

Therefore, movement of the battery 124 is arrested at the intermediate position, shown in FIG. 9, when the latches 616 (having returned to the extended position) engage with the second latch stops 424. As seen in FIG. 9, the secondary actuators (i.e. the actuator surfaces 620) are exposed when the battery 124 is in the intermediate position. The second stage is initiated by pressing inwards on the actuator surfaces 620, to return the latches 616 to the retracted position and thereby disengage the latches 616 from the second latch stops 424. When the latches 616 are disengaged from the second latch stops 424, the battery 124 can be fully withdrawn from the compartment 300.

To replace the battery 124 into the compartment, the front end 604 of the battery 124 is placed into the compartment 300 at the open rear end 404 of the compartment 300. The battery 124 is then pushed into the compartment until the rear end 604 contacts the wall 408 defining the front end of the compartment. As the battery 124 travels into the compartment, the latches 616 move to the retracted position against each of the second and first latch stops 424 and 420. Such movement does not require use of the actuators 200 or 620, as the latches 616 and the latch stops 420, 424 are shaped, as seen in FIG. 8, so as to permit travel of the latches 616 towards the inserted position, while preventing travel of the latches 616 in the return direction (i.e. towards ejection).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device, comprising:
    a device housing defining a battery compartment having (i) an open rear end, (ii) a closed front end, and (iii) a side wall extending between the open rear end and the closed front end;
    a first latch stop extending into the compartment from the side wall between the open rear end and the closed front end;
    a second latch stop extending into the compartment from the side wall between the first latch stop and the open rear end; and
    a battery receivable in the battery compartment, the battery including a latch movable between:
        an extended position wherein the latch is configured to (i) engage the first latch stop when the battery is in an inserted position, to maintain the battery in the inserted position, and (ii) engage the second latch stop when the battery is in an intermediate position, to prevent ejection of the battery from the intermediate position; and
        a retracted position wherein the latch is configured to (i) disengage from the first latch stop to unlock the battery for travel from the inserted position to the intermediate position, and (ii) disengage from the second latch stop for ejection of the battery from the intermediate position.

2. The mobile computing device of claim 1, further comprising:
    a first actuator supported by the device housing and configured to move the latch to the retracted position when the battery is in the inserted position, to disengage the latch from the first latch stop; and
    a second actuator configured to move the latch to the retracted position when the battery is in the intermediate position, to disengage the latch from the second latch stop.

3. The mobile computing device of claim 1, further comprising a bias mechanism for biasing the battery from the inserted position towards the intermediate position.

4. The mobile computing device of claim 3, wherein the closed front end is defined by a front wall supporting an electrical contact configured to electrically connect the battery to the mobile computing device when the battery is in the inserted position; and wherein the bias mechanism is the electrical contact.

5. The mobile computing device of claim 2, wherein the first actuator includes a button disposed at an aperture in the device housing adjacent to the first latch stop.

6. The mobile computing device of claim 2, wherein the second actuator is supported on the battery.

7. The mobile computing device of claim 6, wherein the second actuator includes an actuator surface on the latch.

8. The mobile computing device of claim 6, wherein the battery further comprises a bias member to bias the latch towards the extended position.

9. A battery for a mobile computing device, comprising:
    a battery housing receivable within a battery compartment of the mobile computing device;
    a latch movably supported by the battery housing between:
        an extended position wherein the latch is configured to (i) engage a first latch stop of the battery compartment when the battery is in an inserted position, to maintain the battery in the inserted position, and (ii) engage a second latch stop of the battery compartment when the battery is in an intermediate position, to prevent ejection of the battery from the intermediate position; and
        a retracted position wherein the latch is configured to (i) disengage from the first latch stop to unlock the battery for travel from the inserted position to the intermediate position, and (ii) disengage from the second latch stop for ejection of the battery from the intermediate position.

10. The battery of claim 9, further comprising:
    a secondary actuator supported by the battery housing configured to move the latch to the retracted position when the battery is in the intermediate position, to disengage the latch from the second latch stop.

11. The battery of claim 10, wherein the secondary actuator comprises an actuator surface on the latch.

12. The battery of claim 11, wherein the actuator surface includes a surface feature configured to be concealed within the compartment when the battery is in the inserted position, and exposed when the battery is in the intermediate position.

13. The battery of claim 12, wherein the surface feature includes at least one ridge.

14. The battery of claim 9, wherein the latch is rotatable about a joint defined by the battery housing.

15. The battery of claim 9, further comprising a bias member configured to bias the latch towards the extended position.

16. The battery of claim 15, wherein the bias member comprises a spring between the battery housing and the latch.

17. The battery of claim 9, wherein the latch is disposed on a side of the battery housing; and wherein the battery further comprises a second latch on an opposite side of the battery housing.

18. A mobile computing device, comprising:
- a device housing defining a battery compartment for receiving a battery, the battery compartment having:
  - an open rear end;
  - a closed front end; and
  - a side wall extending between the open rear end and the closed front end;
- a first latch stop extending into the compartment from the side wall between the open rear end and the closed front end, wherein the first latch stop is configured to engage with a latch on the battery to maintain the battery in an inserted position within the battery compartment; and
- a second latch stop extending into the compartment from the side wall between the first latch stop and the open rear end, wherein the second latch stop is configured to engage with the latch to prevent ejection of the battery from an intermediate position.

19. The mobile computing device of claim 18, further comprising:
- a first actuator supported by the device housing and configured to move the latch to the retracted position when the battery is in the inserted position, to disengage the latch from the first latch stop and unlock the battery for movement of the battery from the inserted position to the intermediate position.

20. The mobile computing device of claim 19, wherein the first actuator includes a button disposed at an aperture in the device housing adjacent to the first latch stop.

21. The mobile computing device of claim 20, wherein the first actuator is mounted to a flexible plate affixed to the device housing.

22. The mobile computing device of claim 18, further comprising a bias mechanism for biasing the battery from the inserted position towards the intermediate position.

23. The mobile computing device of claim 22, wherein the closed front end is defined by a front wall supporting an electrical contact configured to electrically connect the battery to the mobile computing device when the battery is in the inserted position; and wherein the bias mechanism is the electrical contact.

\* \* \* \* \*